United States Patent Office 2,999,750
Patented Sept. 12, 1961

2,999,750
PHOTOCONDUCTIVE LAYERS FOR ELECTROPHOTOGRAPHY
Alfred Miller, Munich, and Hildegard Haydn, Leverkusen, Germany, assignors to Agfa Aktiengesellschaft, Leverkusen, Germany, a corporation of Germany
No Drawing. Filed Dec. 10, 1957, Ser. No. 701,726
Claims priority, application Germany Dec. 14, 1956
3 Claims. (Cl. 96—1)

The present invention relates to photoconductive layers for electrophotography, and a process for the production thereof.

It is known to use certain inorganic or organic photoconductive compounds for the production of photoconductive layers for electrophotography. Examples of such compounds are sulphur, selenium, oxides, sulphides, and selenides of zinc, cadmium, mercury, antimony, bismuth, and lead, and also anthracene and anthraquinone. These substances are applied to an electrophotographic plate, especially a plate consisting of metal or another material, for example paper, or to a sheet or foil produced from a film-forming plastic. If necessary, the applied photoconductive substance can be held dispersed in an electrically isolating, layer-forming binder. Such layers are produced by the use of a coating solution in which the binder is either dissolved or dispersed and in which the electroconductive substance is dispersed. Such photoconductive layers are disclosed, for instance, in United States of America Patents 2,297,691; 2,357,809; 2,727,807; 2,727,808; 2,735,784; and 2,735,785, and in French Patents 1,113,-933; 1,122,275; 1,125,235 and 1,136,146.

It has now been found to be particularly advantageous to use highly polymeric linear polycarbonates as binding agents for the photoconductive layer.

Suitable polycarbonates of high molecular weight can for example be produced by reacting aromatic dihydroxy compounds, for example hydroquinone or resorcinol, and especially di-monohydroxy aryl alkanes, alone or in admixture with aliphatic or cycloaliphatic dihydroxy compounds, with aliphatic or aromatic diesters of carbonic acid or with phosgene, or by reacting bis-chlorocarboxylic acid esters of aromatic dihydroxy compounds with free aromatic, aliphatic or cycloaliphatic dihydroxy compounds, for example by the process according to German Patents 971,790, 971,777, 959,497, and 1,011,148.

Polycarbonates which are particularly suitable are for example obtained by using the following di-monohydroxy aryl alkanes:

4,4'-dihydroxy diphenyl methane, 4,4'-dihydroxy diphenyl dimethyl methane, 4,4'-dihydroxy diphenyl-1,1-cyclohexane, 4,4'-dihydroxy-3,3'-dimethyl diphenyl-1,1-cyclohexane, 2,2-dihydroxy-4,4'-di-tertbutyl diphenyl dimethyl methane, 4,4'-dihydroxy diphenyl-3,4-n-hexane, 2,2-(4,4'-dihydroxy diphenyl)-butane, 2,2-(4,4'-dihydroxy diphenyl)-pentane, 3,3-(4,4'-dihydroxy diphenyl)-pentane, 2,2-(4,4'-dihydroxy diphenyl)-3-methyl butane, 2,2-(4,4'-dihydroxy diphenyl)-hexane, 2,2-(4,4'-dihydroxy diphenyl)-4-methyl-pentane, 2,2-(4,4'-dihydroxy diphenyl)-heptane, 4,4-(4,4'-dihydroxy diphenyl)-heptane and 2,2-(4,4'-dihydroxy diphenyl)-tridecane.

The polycarbonates of high molecular weight based on 4,4'-di-monohydroxy aryl alkanes have the following general formula

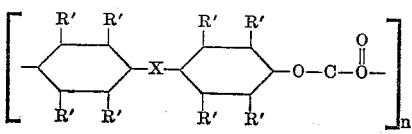

wherein:
X is a

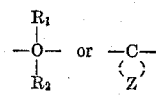

grouping, in which
$R_1$ and $R_2$ are hydrogen atoms branched or unbranched monovalent hydrocarbon radicals with not more than 10 carbon atoms, monovalent cyclo-aliphatic radicals, monovalent araliphatic radicals, phenyl or furyl radicals,
Z represents the atoms necessary to form with the associated carbon atom a cyclo-aliphatic ring,
each R' is a hydrogen atom, a monovalent, branched or unbranched aliphatic hydrocarbon radical with up to five carbon atoms, a monovalent cyclo-aliphatic radical or an aromatic hydrocarbon radical, and R' standing for the same or for different substituents, and
n is a whole number greater than 20, preferably greater than 50.

For preparing the polycarbonates, it is also possible to use the processes of the following Belgian Patents 546,376, 553,614, 546,377, 555,894.

Other suitable polycarbonates of high molecular weight can be obtained by reacting dihydroxy diaryl sulphones or mixtures of dihydroxy diaryl sulphones with other difunctional dihydroxy compounds according to German Patent 1,007,996, and from dihydroxy diaryl ethers or dihydroxy diaryl thioethers or from mixtures of the said compounds with other dihydroxy compounds according to British Patent 809,735. Such polycarbonates are obtained for example by using the following dihydroxy compounds:

4,4'-dihydroxy diphenyl sulphone, 2,2'-dihydroxy diphenyl sulphone, 3,3-dihydroxy diphenyl sulphone, 4,4'-dihydroxy-2,2'-dimethyl diphenyl sulphone, 4,4'-dihydroxy-3,3'-dimethyl diphenyl sulphone, 2,2'-dihydroxy-4,4'-dimethyl diphenyl sulphone, 2,2'-dihydroxy-1,1'-dinaphthyl sulphone, 4,4'-dihydroxy diphenyl ether, 4,4'-dihydroxy-2,2'-dimethyl diphenyl ether, 4,4'-dihydroxy diphenyl sulphide, 4,4'-dihydroxy-2,2'-dimethyl diphenyl sulphide and 4,4'-dihydroxy-3,3'-dimethyl diphenyl sulphide and their homologues.

These polycarbonates are characterized by good fastness to light, high aging resistance, low water absorption and also excellent mechanical properties. The polycarbonates dissolve satisfactorily in a series of low-boiling solvents, for example methylene chloride, and can above all be cast from a non-combustible solvent to form layers. The high vapour pressure of the methylene chloride means that only a short drying period is necessary. The layers produced with this binding agent and a light-conducting compound are characterised by a low dark conductivity and good adhesion to the support.

Solutions of the polycarbonate, for example in methylene chloride, can be blended with solvents of higher boiling point, such as benzene or toluene, without thereby deleteriously affecting the good properties of the layer. If desired, the solutions can be cast without plasticisers.

Sulphur, selenium, oxides, sulphides and selenides of zinc, cadmium, mercury, antimony, bismuth and lead, anthracene, anthraquinone, p-diphenyl benzene, benzanthrone, and aromatic nitriles, especially 1,5-cyanonaphthalene, 1,4-dicyanonaphthalene, aminophthalodinitrile and nitrophthalidinitrile are examples of suitable light-conductive substances.

The quantitative ratios between the photoconductive substances and the binding agents may vary within wide limits. It is preferred to apply the photoconductive substance in an amount of 1 part per 0.3 to 2 parts by weight of binding agent, and in an amount of 5-40 g. per square metre of photoconductive layer.

As a support for the photoconductive layer there may be used paper, or metal plates, such as zinc, aluminum or brass plates. Furthermore, thin foils of cellulose hydrate, cellulose esters or of polyamide may be used.

The photoconductive layers according to the invention may be used in the usual manner. The materials are first made sensitive to light by giving them an electrostatic charge on the coating side in the dark, for instance by means of a corona discharge. The material is then exposed by any of the conventional photographic procedures. The latent image obtained is developed by applying a pigmented resin powder carrying an electrostatic charge which is opposite to that of the photoconductive layer. The powder image produced is then fixed by melting the resin powder.

The photoconductive layers can also be produced from aqueous dispersions of photoconductive substances and binding agents, for instance by the process disclosed in French Patent 1,136,146.

If necessary, the cast dispersions or emulsions of the photoconductive substance are subjected after being dried, to a final condensation or final polymerization by heat treatment at a temperature of from about 80 to 150° C. for about 2 to 30 minutes.

*Example 1*

40 g. of zinc oxide are incorporated by stirring into 100 cc. of a 2% solution of a polycarbonate produced from 4,4'-dihydroxy diphenyl-dimethylmethane according to the process disclosed in Example 1 of British Patent 772,627. This suspension is shaken for several hours on a vibratory mill, cast on paper support and dried. There is obtained a smooth photoconductive layer which is distinguished by good mechanical properties, high shelf life, small water receptivity and high specific electric resistance. The processing of the layers is carried through according to known methods.

*Example 2*

50 cc. of a 5% solution in methylene chloride of a polycarbonate produced from 4,4'-dihydroxy diphenyl methyl ethyl methane by the process disclosed in Example 8 of British Patent 772,627 are diluted with 60 cc. of toluene. 50 g. of ZnO or another light-conductive compound are incorporated by stirring into this mixture and the dispersion is shaken for several hours on a vibratory mill. Layers are cast on a paper support and dried.

*Example 3*

2.5 g. of a polycarbonate produced from 4,4'-dihydroxy diphenyl ether and 2,2-(4,4'-dihydroxy-diphenyl)-butane (molar ratio 1:4) are dissolved in 100 cc. of ethylenechloride. 30 g. of p-terphenyl are added to this solution while stirring. The mixture is ground for several hours in a ball mill, cast on a support, for example a paper or metal support, and dried.

The aforementioned polycarbonate is produced as follows:

Into a solution of 192 g. (0.8 mole) of 2,2-(4,4'-dihydroxy diphenyl)-butane, 57 g. (0.2 mole) of 4,4'-dihydroxy diphenylether in 164 g. of a 10% aqueous solution of caustic soda there are introduced with stirring after the addition of 1000 cc. of methylenechloride and after replacing the air by nitrogen, 149 g. (1.5 moles) of phosgene at an inner temperature of 20° C. over a period of 2 hours. After addition of 0.5 g. of triethylamine and 4 g. of the sodium salt of diisopropylnaphthalinesulfonic acid the mixture reaches within 2 hours a paste-like consistency. The paste is kneaded first with water, then with hydrochloric acid, and again with water, comminuted and dried under reduced pressure. Softening point: 205-225° C.

*Example 4*

58 g. of zinc oxide are incorporated by stirring into a 2% solution in 60 cc. of dioxane of 40 cc. of methylenechloride of a polycarbonate produced from 4,4'-dihydroxydiphenylsulfone according to the process disclosed in Example 1 of German Patent application F 17 168 IVc/39c. The suspension is treated for 2 hours in a ball mill, cast on a paper support and dried.

What we claim is:

1. An electrophotographic sheet material comprising an electrically conductive base plate, and coated on said plate a non-photoconductive binding agent having dispersed therein a particulate photoconductive insulating substance for electrophotography, said binding agent consisting of a solid film-forming polyester of carbonic acid and an aromatic dihydroxy compound containing as sole reactive groups hydroxyl groups, said polyester being soluble in organic solvents and comprising structural units which are the esterification product of carbonic acid and a member of the group consisting of di-(monohydroxyaryl)-alkanes, dihydroxy-diaryl-sulfones, dihydroxy-diaryl ethers and dihydroxy-diaryl thioethers, said groups members containing as sole reactive groups hydroxy groups, said photoconductive substance being employed in proportions of about 1 part per 0.3-2 parts by weight of binding agent, and in an amount of 5-40 g. per square meter.

2. The electrophotographic sheet materials of claim 1 wherein said non-photoconductive binding agent is soluble in methylene chloride.

3. Process of claim 1 wherein said photoconductive substance is zinc oxide.

References Cited in the file of this patent

UNITED STATES PATENTS 2,663,636     Middleton     Dec. 22, 1953

OTHER REFERENCES

Wainer: Photographic Engineering, vol. 3, No. 1, pp. 12-22 (1952).

Young et al.: R.C.A. Review, vol. XV, No. 4, pp. 469-484 (December 1954).

Schnell: Angewandte Chemie, vol. 68, No. 20, pp. 633-640 (October 1956).

Metcalfe et al., Jour. of the Oil and Colour Chemists Assoc., vol. 39, No. 11, pp. 845-856 (November 1956).